UNITED STATES PATENT OFFICE.

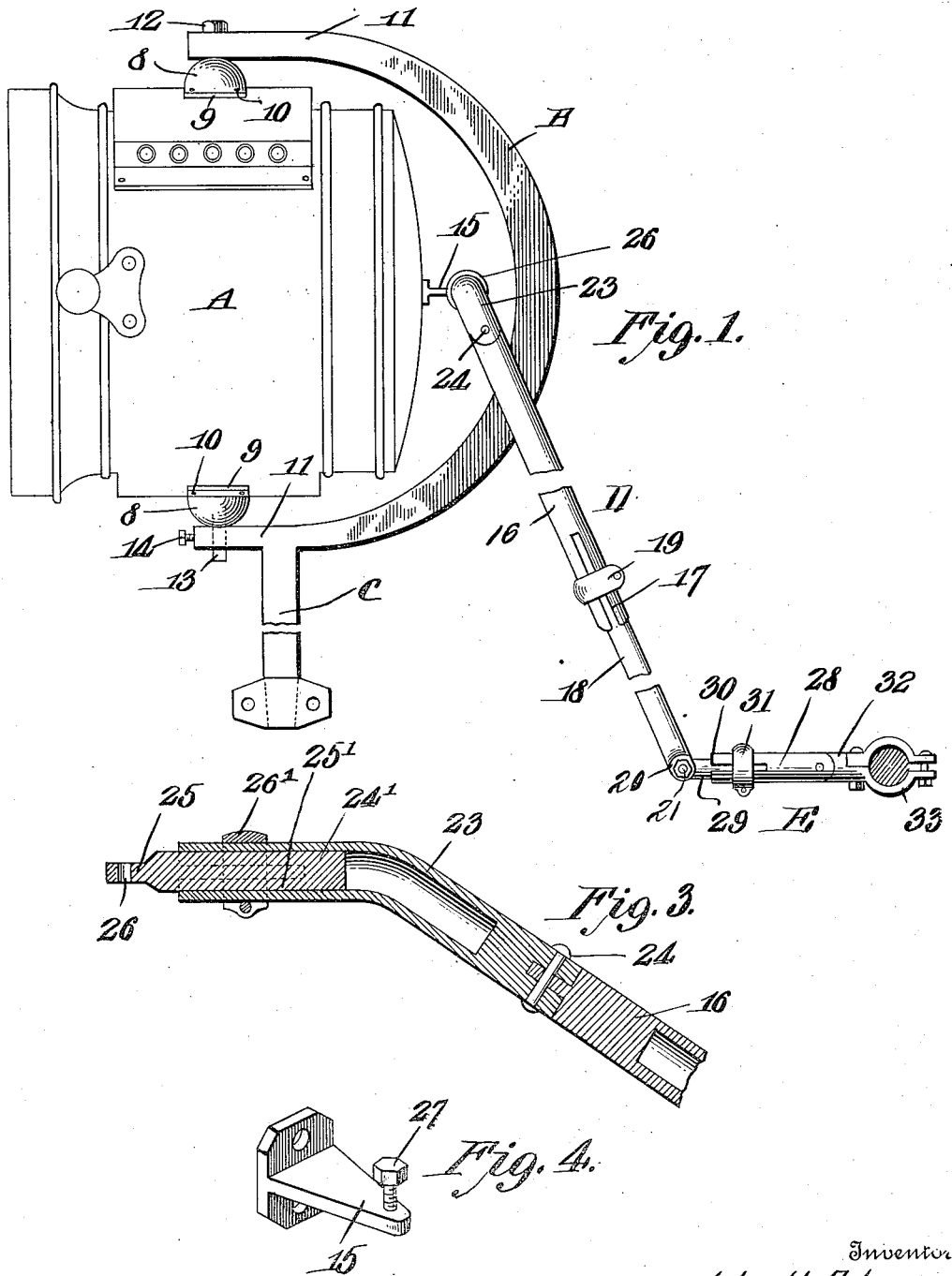

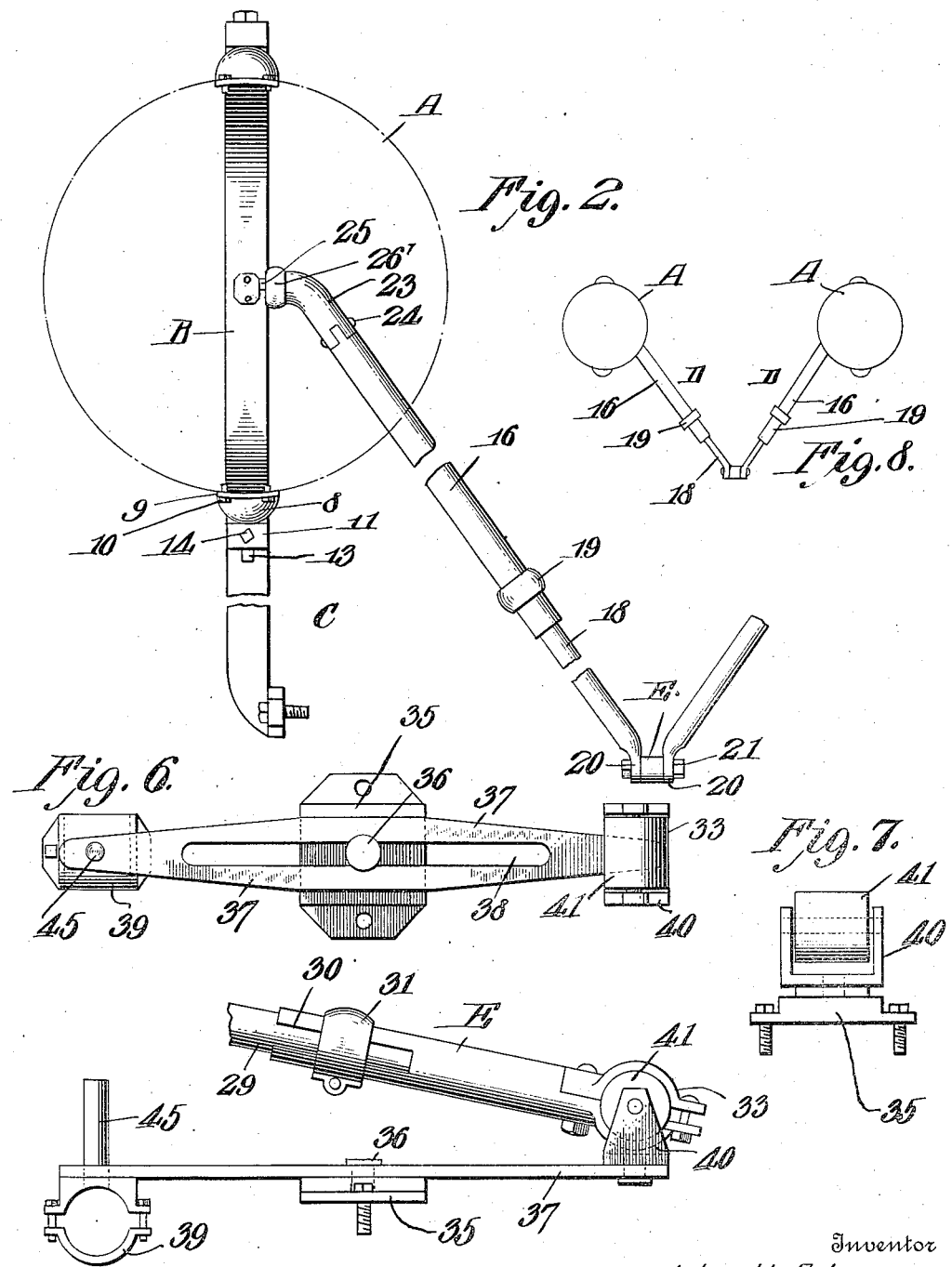

JOHN H. ADAMS, OF BROOKLYN, NEW YORK.

HEADLIGHT ATTACHMENT FOR AUTOMOBILES.

988,058.  Specification of Letters Patent.  Patented Mar. 28, 1911.

Application filed October 30, 1909. Serial No. 525,435.

*To all whom it may concern:*

Be it known that I, JOHN H. ADAMS, a citizen of the United States of America, residing at Brooklyn, in the county of Kings and State of New York, have invented new and useful Improvements in Headlight Attachments for Automobiles, of which the following is a specification.

This invention relates to improved headlight attachments for automobiles, and it has for its object to produce a simple and efficient device whereby the headlights shall be automatically presented in a forward direction when the direction of movement is changed by means of the steering gear.

A further object of the invention is to provide improved means whereby the headlight may be pivotally supported.

A still further object of the invention is to provide connecting and adjusting means for the headlights whereby the same may be connected with the steering rod.

Still further objects of the invention are to simplify and improve the general construction and operation of this class of devices.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention; it being, however, understood that no limitation is necessarily made to the precise structural details therein exhibited, but that changes, alterations and modifications within the scope of the invention may be resorted to when desired.

In the drawings,—Figure 1 is a side elevation of a device constructed in accordance with the invention. Fig. 2 is a front view, showing one of the headlight supports and related parts, the headlight casing being indicated in dotted lines. Fig. 3 is a sectional detail view of one of the connecting rods. Fig. 4 is a perspective detail view of one of the brackets carried by the headlights. Fig. 5 is a detail side elevation illustrating a modified form of a part of the invention. Fig. 6 is a detail plan view further illustrating said modification. Fig. 7 is a detail end view further illustrating said modification. Fig. 8 is a diagrammatic view illustrating the complete device.

Corresponding parts in the several figures are denoted by like characters of reference.

Each light A is supported by means of a yoke-shaped bracket B having a clip C by means of which it may be mounted upon the spring of an automobile or in some other suitable or convenient position. Each headlight A is provided with semi-spherical bearing members 8, said bearing members being preferably constructed with flanges 9 for the passage of fastening members, such as rivets 10, whereby they may be secured upon the upper and lower sides of the headlight casing, and said bearing members being adapted for engagement with pivots extending through the limbs 11 of the yoke or bracket. The upper pivot has been shown as consisting of a stud bolt 12; the pivot extending through the lower limb 11 has been shown as consisting of a vertically movable and adjustable pin 13 which may be retained in position by a set screw 14. By this arrangement the pivotal pin 13 may be adjusted vertically or a longer one may be substituted if desired in order to enable a headlight of smaller size to be used. Suitably secured upon the rear wall of the headlight casing is a bracket member 15 extending in an approximately horizontal plane.

The adjusting device includes two connecting devices D, D, each including a tubular member 16, the lower end of which is slotted, as shown at 17, for the admission of a rod 18 telescoping into said tubular member where it may be securely retained at various adjustments by means of a clamp 19 fitted upon the slotted portion of the tube. The connecting devices D, D converge downwardly in the direction of each other, and said connecting members are pivotally connected with one end of a link E included therebetween, the ends of the rods 17 being bent to form apertured eyes 20 for the passage of the connecting pin or pivot 21. The tubular portions 16 of the connecting devices D are provided at their upper ends with arms 23 hingedly connected therewith by means of pins 24, said arms being of tubular construction and provided with bent portions lying in an approximately horizontal plane. Said horizontal portions are provided with telescoping extension rods 24' for the reception of which the said horizontal portions of the tubular arms are slotted, as shown at 25', and provided with holding clamps 26'. The extension rods 24' are provided with terminal lugs 25 lying in an approximately horizontal plane and provided with vertical apertures 26 for the reception of pins or bolts, whereby they are hingedly connected with the bracket members 15 upon the rear sides of the headlight casings, said connecting pins or bolts being best seen at 27 in Fig. 4 of the drawings.

The link E, which is included between and pivotally connected with the lower ends of the connecting devices D, D, is composed of a tubular member 28 having an extension rod 29 telescoped into its forward end which is slotted, as shown at 30, and provided with a holding clamp 31. The extension rod 29, which constitutes the forward portion of the link E, is pivotally connected with the devices D, D, as hereinbefore described. The opposite end of the link E is provided with an arm 32 hingedly connected therewith so as to be capable of movement in a vertical plane and provided with a clip 33, whereby it may be connected with and securely mounted upon the steering rod on the automobile.

By the device constructed and arranged as herein described, the pivotally supported headlights are connected by the devices D, D with the link E, which in turn is mounted upon the steering rod, the construction illustrated in Figs. 1 to 4, inclusive, being particularly adapted to machines where the steering rod is located in rear of the front axle. It will be readily seen that the extension rods or members 18, 24' and 29 enable adjustment to be made to the varying conditions encountered in various makes of machines. When in steering the machine the steering rod is moved in the direction of its length transversely of the machine, it carries the link E, thus shifting the position of the connecting devices D, D and turning the headlights upon their pivots so as to present the light in the direction taken by the wheels of the machine.

In Figs. 5, 6 and 7 of the drawings has been illustrated a slight modification, whereby the invention is particularly adapted to machines in which the steering rod is disposed in front of the front axle. Under this modification there is provided a plate 35 adapted to be mounted upon the axle and having an upwardly extending headed pin 36 upon which is mounted a longitudinally movable rod 37 having a slot 38 to permit it to move longitudinally. Said slide is provided at one end with a clip 39 connected therewith by a pivot member 45, said clip being adapted to engage the steering rod and at its opposite end with a clip or keeper 40 carrying a roller 41 engaged by the clip 33 of the link E.

From the foregoing description taken in connection with the drawings hereto annexed, the operation and advantages of this invention will be readily understood. The construction is simple, and the device may be quickly and inexpensively installed upon automobiles and motor vehicles of any ordinary or conventional construction, the operation being such that the headlights will be automatically and at all times presented in the proper direction.

Having thus described the invention, what is claimed as new, is:—

1. A supporting bracket having an attaching clip, a headlight pivotally mounted in the bracket, a connecting device including a tubular member and extension members telescoping in the upper and lower ends thereof, the upper extension member being pivotally connected with the headlight, a link connected at one end with the lower extension member of the connecting device, and a clip at the opposite end of said link.

2. In a device of the character described, a pivotally supported headlight, a movably supported steering rod and connecting means between the headlight and the steering rod including a connecting member of tubular form having an arm hingedly connected therewith at one end and provided at its opposite end with an extension member telescoping therein, and means for retaining said extension member in adjusted position.

3. In a device of the character described, a pivotally supported headlight, a movably supported steering rod, and means for connecting the headlight with the steering rod including a plurality of connecting members each adjustable as to its length and each comprising a plurality of hingedly connected members.

4. In a device of the character described, a pair of brackets having attaching clips, headlights pivotally supported in said brackets, a link provided at one end with a clip, and a pair of connecting members each connected pivotally at its upper end with one of the headlights and both connected pivotally at their lower ends with one end of the link, said link and connecting members being each composed of a plurality of parts extensibly connected and said link and connecting members including each a plurality of hingedly connected parts.

5. In a device of the character described, a pair of pivotally supported headlights, a link having a clip at one end, a pair of connecting members pivotally connected at their lower ends with the link and each being pivotally connected at its upper end with one of the headlights, a supporting member consisting of a plate having a headed stud, and a longitudinally slotted slide movable upon said stud, said slide being equipped at one end with a clip adapted to engage the steering rod of a motor vehicle and said slide being provided at its opposite end with means for pivotally connecting it with one end of the link.

In testimony whereof I affix my signature in presence of two witnesses.

JOHN H. ADAMS.

Witnesses:
 MAX MENAKER,
 ADOLPH LINDER.